United States Patent
Olander, III et al.

(10) Patent No.: US 9,721,265 B2
(45) Date of Patent: Aug. 1, 2017

(54) SYSTEMS AND METHODS FOR GENERATING ADAPTIVE SURVEYS AND REVIEW PROSE

(71) Applicant: PowerReviews OC, LLC, San Francisco, CA (US)

(72) Inventors: Gilbert T. Olander, III, Elmhurst, IL (US); Christopher Lubkert, Chicago, IL (US); Joe Lobraco, Hoffman Estates, IL (US); Brian Dillard, Chicago, IL (US)

(73) Assignee: PowerReviews OC, LLC, San Francisco, CA (US)

( * ) Notice: Subject to any disclaimer, the term of this patent is extended or adjusted under 35 U.S.C. 154(b) by 673 days.

(21) Appl. No.: 13/737,668

(22) Filed: Jan. 9, 2013

(65) Prior Publication Data

US 2014/0193794 A1   Jul. 10, 2014

(51) Int. Cl.
*G06Q 30/02* (2012.01)
*G09B 7/06* (2006.01)

(52) U.S. Cl.
CPC .......... *G06Q 30/0203* (2013.01); *G09B 7/06* (2013.01)

(58) Field of Classification Search
CPC combination set(s) only.
See application file for complete search history.

(56) References Cited

U.S. PATENT DOCUMENTS

| | | | |
|---|---|---|---|
| 7,620,651 B2 | 11/2009 | Chea et al. | |
| 7,930,363 B2 | 4/2011 | Chea et al. | |
| 7,937,391 B2 | 5/2011 | Chea et al. | |
| 8,214,261 B2 | 7/2012 | Chen et al. | |
| 8,321,300 B1 | 11/2012 | Bockius et al. | |
| 8,589,246 B2 | 11/2013 | Chen et al. | |
| 8,600,796 B1 | 12/2013 | Sterne et al. | |

(Continued)

OTHER PUBLICATIONS

Rada Mihalcea, Dragomir Radev. "Graph-Based Algorithms for Information Retrieval and Natural Language Processing". HLT/NAACL, Jun. 4, 2006, New York Marriott at the Brooklyn Bridge, Brooklyn, NY. Tutorial Presentation, slides 1-2 and 89-180.*

(Continued)

*Primary Examiner* — William Brockington, III
*Assistant Examiner* — Abhijit B Sadananda
(74) *Attorney, Agent, or Firm* — Drinker Biddle & Reath LLP

(57) ABSTRACT

Systems and methods are provided for generating adaptive surveys including questions and answer options selectable by users, and human-readable review prose based on answers to the questions. The survey may be related to an assessment of a business, and may be transmitted to a user electronic device. The generated survey may include one or more questions with selectable answer options. The selection of the answer options can be received from the user electronic device, and be used to generate the prose for the review. The user and/or the business may edit the prose and/or modify the intensity of the generated review. Tree data structures may be utilized to generate the questions of the survey, to store the answers, and generate the sentences of the review. Analytic data may be generated based on the selected answer options, which can be used to assess and influence marketing and business efforts.

28 Claims, 11 Drawing Sheets

(56) References Cited

U.S. PATENT DOCUMENTS

| | | | |
|---|---|---|---|
| 8,666,853 B2 | 3/2014 | Bockius et al. | |
| 2001/0049688 A1* | 12/2001 | Fratkina et al. | 707/104.1 |
| 2002/0095431 A1* | 7/2002 | Mc George et al. | 707/200 |
| 2003/0028665 A1* | 2/2003 | McAllister et al. | 709/238 |
| 2003/0033193 A1* | 2/2003 | Holloway et al. | 705/10 |
| 2004/0103017 A1* | 5/2004 | Reed et al. | 705/10 |
| 2004/0225651 A1* | 11/2004 | Musgrove et al. | 707/4 |
| 2006/0101335 A1* | 5/2006 | Pisciottano | 715/531 |
| 2007/0166684 A1* | 7/2007 | Walker | 434/322 |
| 2009/0306967 A1* | 12/2009 | Nicolov et al. | 704/9 |
| 2010/0049590 A1* | 2/2010 | Anshul | 705/10 |
| 2010/0205549 A1 | 8/2010 | Chen et al. | |
| 2010/0205550 A1 | 8/2010 | Chen et al. | |
| 2011/0231207 A1* | 9/2011 | Easterly | 705/3 |
| 2012/0096454 A1 | 4/2012 | Chea et al. | |
| 2012/0117459 A1 | 5/2012 | DeHaven et al. | |
| 2012/0124463 A1 | 5/2012 | DeHaven et al. | |
| 2012/0245924 A1* | 9/2012 | Brun | 704/9 |
| 2012/0324369 A1* | 12/2012 | Safa | 715/751 |
| 2013/0103445 A1 | 4/2013 | Alonso Lord et al. | |
| 2013/0179794 A1 | 7/2013 | Eastham et al. | |
| 2013/0226656 A1 | 8/2013 | Sedota, Jr. et al. | |
| 2013/0226820 A1 | 8/2013 | Sedota, Jr. et al. | |
| 2013/0297426 A1 | 11/2013 | Marx et al. | |
| 2014/0108559 A1 | 4/2014 | Grochowicz et al. | |
| 2014/0149311 A1 | 5/2014 | Chen et al. | |
| 2014/0156481 A1 | 6/2014 | Gilveli | |
| 2014/0164061 A1 | 6/2014 | Sterne et al. | |

OTHER PUBLICATIONS

Bo Pang, Kevin Knight, Daniel Marcu. "Syntax-Based Alignment of Multiple Translations: Extracting Paraphrases and Generating New Sentences". HLT/NAACL, Jun. 2003, Edmonton, Canada. Main Papers, p. 102-109.*

Bo Pang, Lillian Lee. "Opinion Mining and Sentiment Analysis". Foundations and Trends in Information Retrieval, vol. 2, No. 1-2 (2008), p. 1-135.*

* cited by examiner

1st United Auto Sales

How would you describe the prices?

☐ very cheap

☑ fairly priced

[Next]

FIG. 6C

1st United Auto Sales

What did you find convenient about 1st United Auto Sales?

☑ Easy to set up an appointment

☐ Many appointment times available

☑ Flexible appointment times

☐ Online scheduling

[Next]

FIG. 6D

1st United Auto Sales

Was there anything you did not like about 1st United Auto Sales?

☐ work done

☑ professionalism

[Next]

FIG. 6E

1st United Auto Sales

How would you describe 1st United Auto Sales?

☑ untrustworthy

☐ rude

☐ late

☑ lacking qualifications

☐ lacking proper accreditation

[Next]

FIG. 6F

1st United Auto Sales

INSTRUCTIONS HERE

Headline

> I loved 1st United Auto Sales because of their prices and convenience.

Why I recommend 1st United Auto Sales

> I found the prices to be fair. That they made it easy to set up an appointment and had flexible appointment times was something I appreciated.

Why I do not recommend 1st United Auto Sales

> On the other hand, I thought their unprofessionalism could be improved. They were untrustworthy. They lacked qualifications.

[Publish]

FIG. 6G

VIEWPOINTS

Tommy Bahama's review of 1st United Auto Sales

Overall Review Text

I loved 1st United Auto Sales because of their prices and convenience. I found the prices to be fair. That they made it easy to set up an appointment and had flexible appointment times was something I appreciated.

On the other hand, I thought their unprofessionalism could be improved. They were untrustworthy. They lacked qualifications.

Suggestion
Start selling tires.

Recommend
Yes

Published on Friday, November 9, 2012

FIG. 6I

SYSTEMS AND METHODS FOR GENERATING ADAPTIVE SURVEYS AND REVIEW PROSE

FIELD

This application generally relates to the generation of adaptive surveys and review prose. In particular, the application relates to generating surveys including questions and answer options selectable by users, and generating human-readable reviews and analytic data based on the answers to the questions.

BACKGROUND

Consumers that patronize a business may review the business on websites such as Yelp, Yahoo, Google, and other websites. The reviews may be positive, neutral, or negative and are often independently created by the consumers, as opposed to being initiated by the business. Many prospective consumers look for information about a business when making a decision as to whether to patronize a particular business. Such prospective consumers often utilize portable electronic devices, such as smartphones, since these decisions may be spontaneous and spur of the moment. These prospective consumers tend to be significantly influenced by the reviews from consumers who have patronized the business and view such reviews as more trustworthy than other sources of information. Accordingly, if prospective consumers view negative reviews about a business, they may be less likely to patronize the business. Similarly, if prospective consumers see positive reviews about the business and/or that a business is responsive to concerns and issues, they may be more likely to patronize the business.

While typical reviews of businesses may have some uniformity across different consumers (e.g., through the use of numerical and star ratings), typical reviews may also include free form testimonials that are not uniform across the different consumers. For example, because they may have been created in any format, these testimonials can be unfocused. As such, it may be more difficult for prospective consumers to gain useful information from such reviews. In some cases, prospective consumers may be dissuaded from patronizing the business if it is too challenging to glean useful information from such unfocused reviews.

Consumers who have had negative experiences are also more likely to create reviews, which can skew the ratings and reviews of the business. Because such reviews are independently created by consumers, it is generally more difficult for the business to respond to problems and issues. The business may have to monitor reviews on multiple websites and attempt to respond to problems and issues raised in the reviews. However, prospective consumers may have already viewed these reviews and made decisions based on them.

These independently-created reviews also do not directly assist the business in analyzing the needs and wants of their customers. Instead, business can attempt to use these reviews created by self-selected consumers to plan marketing strategies. However, quantifying the characteristics of unfocused reviews and free form testimonials may be time-consuming, complex, and unfeasible. Furthermore, the consumer writing a review may create their review well after patronizing the business, which may cloud the consumer's recollection about the business. This may be the case if the consumer wishes to compose a longer review on a computer keyboard, as opposed to on a portable device, for example.

Accordingly, there is an opportunity for systems and methods that address these concerns. More particularly, there is an opportunity for systems and methods that generate adaptive surveys including questions and answer options selectable by users and generate human-readable reviews and analytic data based on the answers to the questions.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

FIGS. 6A-6I illustrate exemplary embodiments of a generated survey and a generated review.

DETAILED DESCRIPTION

Figure 1:
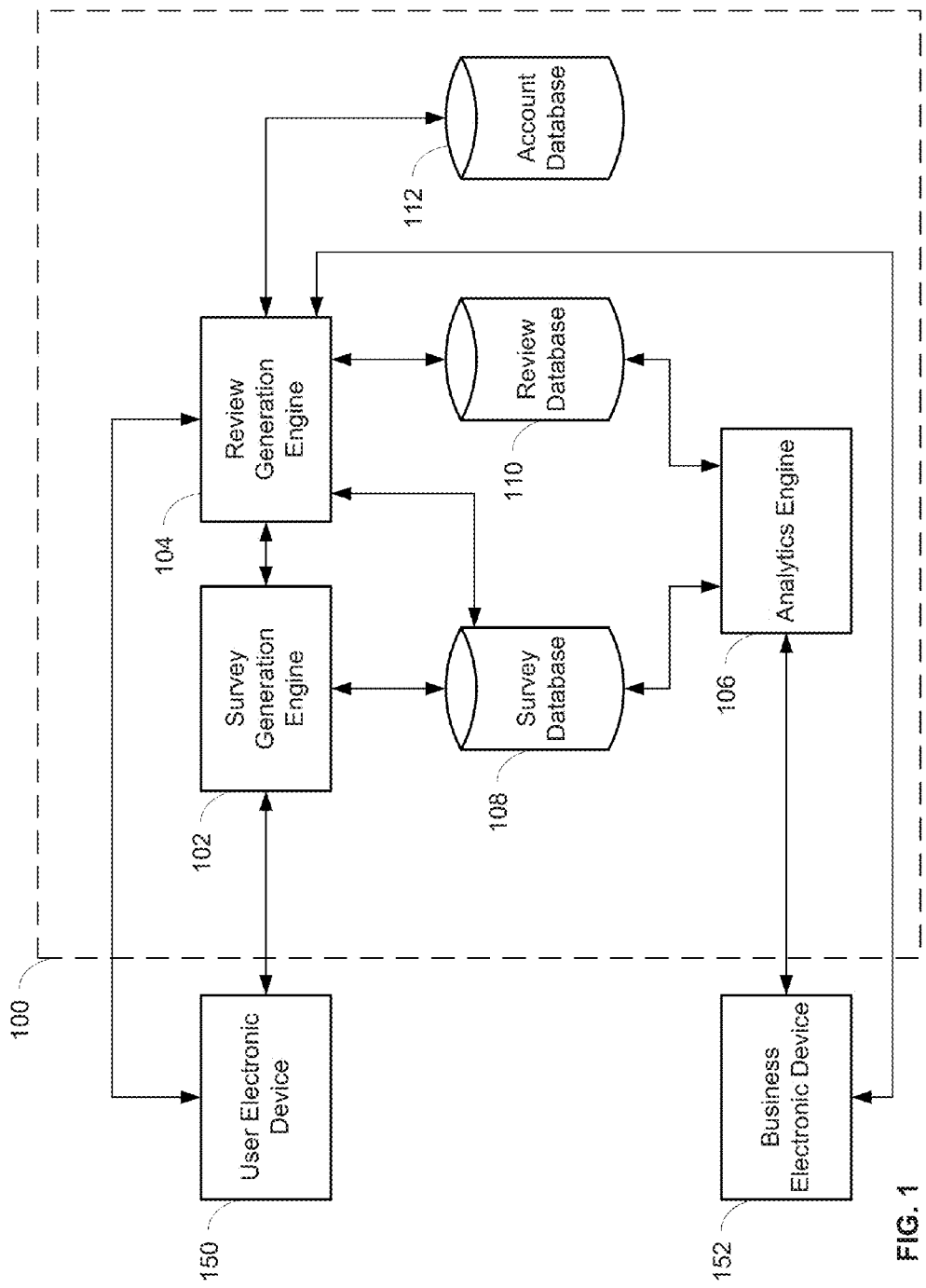
FIG. 1 is a block diagram illustrating a system for generating adaptive surveys and review prose.

Systems and methods are disclosed for generating adaptive surveys and review prose based on answers to the surveys. According to one embodiment, a method for generating a survey and a review may include generating the survey with at least one question and answer options for the at least one question. The survey may be transmitted to an electronic device associated with a user. A selection of at least one answer from the answer options can be received from the electronic device associated with the user. The selection of the at least one answer may be stored in a database. A review may be generated based on sentence templates and the selection of the at least one answer. The review may be transmitted from the processor to the electronic device associated with the user, and an edited review may be received from the electronic device associated with the user. The edited review may be transmitted to an electronic device associated with a business and an approval of the edited review may be received from the electronic device associated with the business. The edited review may be stored in the database and may be associated with the business.

According to another embodiment, a system for generating a survey and a review may include a processor in communication with a network and a memory in communication with the processor. The memory may include a survey database and a review database. The memory may also include a survey generation engine for generating the survey with at least one question and answer options for the at least one question, and transmitting the survey to an electronic device associated with a user. The survey generation engine may also be for receiving a selection of at least one answer from the answer options from the electronic device associated with the user. The selection of the at least one answer may be stored in a database by the survey generation engine. The memory may further include a review generation engine for generating a review based on sentence templates and the selection of the at least one answer. The review may be transmitted by the review generation engine to the electronic device associated with the user, and an edited review may be received from the electronic device associated with the user at the review generation engine. The review generation engine may transmit the edited review to an electronic device associated with a business and an approval of the edited review may be received from the electronic device associated with the business at the review generation engine. The edited review may be stored in the database by the review generation engine and may be associated with the business.

The systems and methods as discussed herein can offer improvements to existing technologies. In particular, users, such as consumers who have recently patronized a business, may be able to receive and answer a survey about the business. The survey may be accessible on the electronic device of the user, such as a smartphone or other mobile device. The survey may be in the form of questions with multiple choice answers and/or free response text fields that can be easily and quickly answered by the user. The questions may be focused on the primary criteria that consumers use when making purchase decisions about a business, such as value, service, and convenience, for example. The answers to the surveys can be used to automatically generate human-readable prose of a review of the business. Because the prose of the review is automatically generated based on the survey answers, the reviews from consumers may be more uniform and be focused on the reasons consumers and prospective consumers make purchasing decisions. The business may be notified about each generated review and can take the reviews into consideration in making marketing and business decisions. The business can also respond quickly and easily to the reviews. Furthermore, future marketing and business efforts can be guided and improved based on analytic data obtained based on the answers to the survey. It should be appreciated that other benefits and efficiencies are envisioned.

Figure 2:
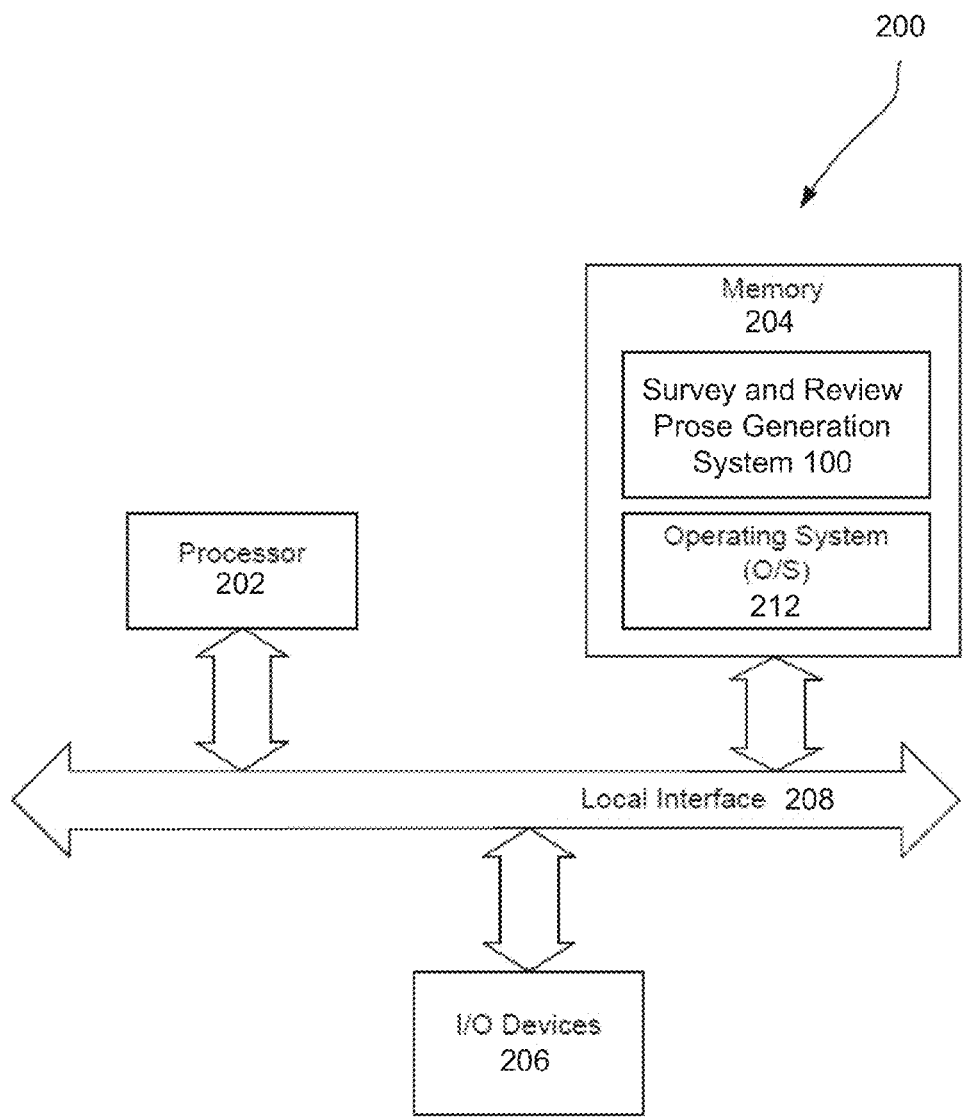
FIG. 2 is a block diagram of one form of a computer or server of FIG. 1, having a memory element with a computer readable medium for implementing the system of FIG. 1.

FIG. 1 illustrates a survey and review prose generation system 100 for generating adaptive surveys and human-readable review prose, in accordance with one or more principles of the invention. The survey and review prose generation system 100 may generate a survey with questions and answer options for each of the questions, then generate a review based on sentence templates and the selected answer options. In some embodiments, the survey may be related to a business and the user taking the survey may have been a consumer who has patronized the business. The survey and review prose generation system 100 may also generate analytic data based on the answers to the survey. Various components of the survey and review prose generation system 100 may be implemented using software executable by one or more servers or computers, such as a computing device 200 with a processor 202 and memory 204 as shown in FIG. 2, which is described in more detail below.

A user electronic device 150 may communicate with a survey generation engine 102 and a review generation engine 104 in the survey and review prose generation system 100. A business electronic device 152 may communicate with the review generation engine 104 and an analytics engine 106 in the survey and review prose generation system 100. The user electronic device 150 and/or the business electronic device 152 may be, for example, a smartphone, a cellular phone, a personal digital assistant, a tablet computer, a laptop computer, or the like. In one embodiment, applications executing on the user electronic device 150 and/or the business electronic device 152 may facilitate communication with the survey and review prose generation system 100. The application may include a web browser, a specific application for communicating with the survey and review prose generation system 100, or another type of application. The user may include a consumer who has patronized a business, for example. The business may include any type of business wishing to gather feedback regarding their business, such as, for example, contractors, retailers, restaurants, service providers, etc. In some embodiments, the user may include a person who has used a particular product, visited a particular location (e.g., a tourist attraction), attended a particular event, and the like.

A trigger to initiate and generate a survey may be received from the user electronic device 150 by the survey generation engine 102. The trigger may include requests to initiate and generate the survey through a standard or mobile website, an email or SMS text containing a link to the system 100 (e.g., a URL), a quick response (QR) code representing the link, near field communication (NFC), geofencing, and/or other triggers. For example, a business can send an email or SMS text including a link to the system 100 to the user electronic device 150 of the consumer patronizing the business when a loyalty card is scanned or if the consumer gives their email address or phone number to the business at a point of purchase. As another example, signage at the business or a receipt given to the consumer may be printed with a QR code or URL to the system 100 so that the user electronic device 150 can be directed to the system 100. As a further example, an NFC transceiver may be available to the consumer at the business so that the user electronic device 150 can communicate with the NFC transceiver to be directed to the system 100. As another example, a geofence can be utilized so that it can be determined whether the user electronic device 150 has left the premises of the business (or some other geographic boundary), and automatically redirect the user electronic device 150 to the system 100. In some embodiments, the consumer could utilize an electronic device (e.g., a tablet computer) at the business to access the system 100 and answer the survey. Other types of triggers to initiate and generate the survey from the user electronic device 150 are contemplated.

After a trigger has been received, the survey generation engine 102 may generate a survey corresponding to the business and/or the category of the business. The survey may include a series of one or more questions with each of the questions including multiple answer options. The answer options may be selectable and the user may select one or multiple answer options, such as by using checkboxes and/or radio buttons, as appropriate. The answer options may include one or more free response text answer fields, in some embodiments. The survey may accordingly be unique to the business and/or the category of the business so that the questions and answer options are suitable and appropriate. For example, if the business is a contractor, the questions and answer options may be related to professionalism and value, as these factors tend to be more important to consumers of contractors. As another example, if the business is a retailer, the questions and answer options may be related to price and convenience. In some embodiments, the business can control the tone of the generated survey, e.g., the generated questions and the answer options, as desired. For example, the business can select particular categories and/or types of words and/or phrases for the survey, and/or create custom questions and/or answer options.

The survey generation engine 102 may access the survey database 108 to generate the survey based on a choice tree data structure that corresponds to the business and/or the category of the business. The choice tree may include a set of linked choice nodes that can be the basis for generating the questions of the survey. The survey database 108 may include a choice tree data structure (with corresponding attributes, as described below) for some or all of the known businesses in one or more geographic areas, e.g., neighborhood, town, city, state, zip code, country, etc. Each of the choice nodes may have any number of child choice nodes that can be the basis for generating future follow-up questions and the answer options for such questions. Each choice node and child choice node may have attributes including a choice type, a question choice value, a question text value, a sentence value, an analytic value, and/or other attributes. The choice type may include a token that determines the syntactic type of the sentence value so that the sentences in the review generated by the review generation engine 104 have the correct syntax, as described below. For example, a choice type may include a noun, a verb, an adjective, a sentence fragment, and/or other syntactic type. The question choice value may include a value that can be displayed as a possible answer option that a user can select in response to a question in the survey. For example, a question choice value may include "yes", "no", "convenience", etc.

The question text value may include a value that can be substituted into a future follow-up question presented to the user if the user selects the particular choice node. For example, if a user selects an answer option associated with a choice node related to a criteria of "value", the question text value for a future question may include "prices" so that the future follow-up question that is generated asks the user to describe the prices of the business. The sentence value may include a value that can be used to construct sentences in a generated review. For example, if the choice node is related to recommending the business, the sentence value may include the word "recommend", so that a sentence generated in the review states "I recommend this business." The analytic value may include a value used to produce analytic data that is related to the business and/or the category of the business.

Each choice node may be related to a question entity that includes the template text for the current question to be posed to a user. The question entity can include the type of question that indicates how the user may interact with the answer options (e.g., single selection, button selection, multiple selection, free response, etc.) and the template text of the question. The template text of the question may include placeholders for substituting particular word(s). For example, the template text may be "Would you recommend <BUSINESS> to a friend?" and the placeholder <BUSINESS> can be replaced with the name of the business. As another example, the template text may be "How would you describe the <CHOICE>?" and the placeholder <CHOICE> can be replaced with the question text value in a child choice node corresponding to an answer option that a user had previously selected.

Each question and its corresponding answer options of the generated survey can be transmitted from the survey generation engine 102 to the user electronic device 150. One, some, or all of the questions and corresponding answer options may be transmitted to the user electronic device 150. In some embodiments, each of the questions and corresponding answer options may be transmitted to the user electronic device 150 serially and in an adaptive manner, e.g., based on the answer to a preceding question. For example, when a user selects an answer for a particular question, tokens in the selected answer's corresponding choice node may determine the next question of the survey. Therefore, the survey generation engine 102 can iteratively traverse the choice nodes of the choice tree to generate each of the questions and their corresponding answer options. In some embodiments, the choice nodes may be traversed randomly. In particular, the full text of a particular question can be generated by substituting the question text value of a particular choice node and its parent choice node (if applicable) into a question text template, as appropriate. The answer options for the particular question may be generated from the question choice values in each of the child choice nodes of the particular choice node.

The user can select one or more of the answer options for the particular question on the user electronic device 150, such as by clicking or tapping on one or more of the desired answer options, as appropriate. Some questions may ask the user to select a single answer option, other questions may ask the user to select one or more answer options, while still other questions may ask the user to respond in a free response text answer field. Each of the selected answer option(s) in response to a question may be received from the user electronic device 150 at the survey generation engine 102 and saved in the survey database 108. The selected answer options may be stored in an answer tree data structure in the survey database 108. The answer tree may include a set of linked answer nodes that each represents the answer option selected by a user for a particular question. The answer tree may include a root answer node and any number of child answer nodes of the root answer node. The root answer node and each of the child answer nodes may have attributes including a selected answer option value, an initial answer value, a back token value, an intensity value, a completed flag, and/or a free response text answer field value. The answer tree and its answer nodes may have a relationship with the choice tree that the survey is based on. In particular, the root answer node and each of the child answer nodes may respectively correspond to a choice node in the choice tree. In this way, a particular answer node in the answer tree can have access to and retrieve the attributes in the corresponding choice node for purposes of generating sentences of the review, as described below. In some embodiments, the survey generation engine 102 may also prompt the user with one or more free response text answer fields for the purpose of gathering miscellaneous comments and suggestions from the user. The contents of a response to the free response text answer field may also be stored in the answer tree of the survey database 108.

Figure 6A:
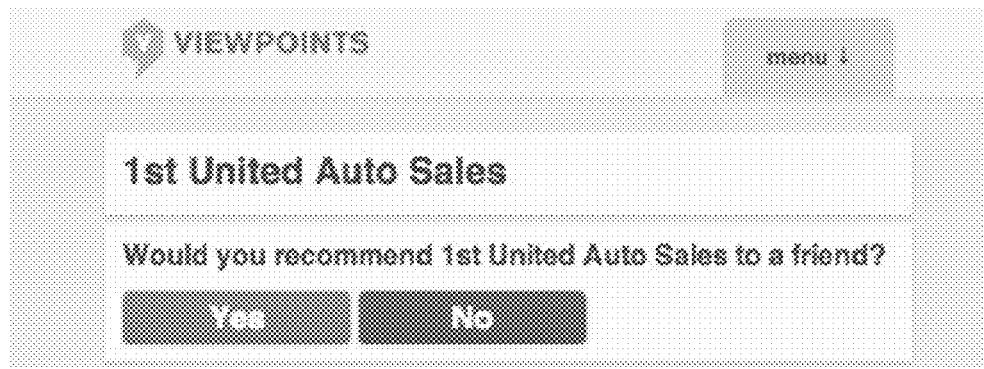

FIGS. 6A-6F illustrate exemplary embodiments of questions and corresponding answer options of a survey generated by the survey and review prose generation system 100 and the survey generation engine 102. The survey may be shown on a display of the user electronic device 150, for example. In particular, each of FIGS. 6A-6F illustrates a question and corresponding answer options that may be posed to a user of the user electronic device 150 who is answering a survey related to a business called 1st United Auto Sales. The survey generation engine 102 may have determined a choice tree that corresponds to this business and/or the category of this business, e.g., auto retailer. The initial choice node of the choice tree is related to a question entity with template text of "Would you recommend <BUSINESS> to a friend?" and a question type of single selection, and has question choice values of "yes" and "no" for answer options. As shown in FIG. 6A, the generated question displayed to the user is "Would you recommend 1st United Auto Sales to a friend?" and the answer options are "Yes" and "No". The business name "1st United Auto Sales" has been substituted into the placeholder <BUSINESS> in the question template text.

Figure 6B:
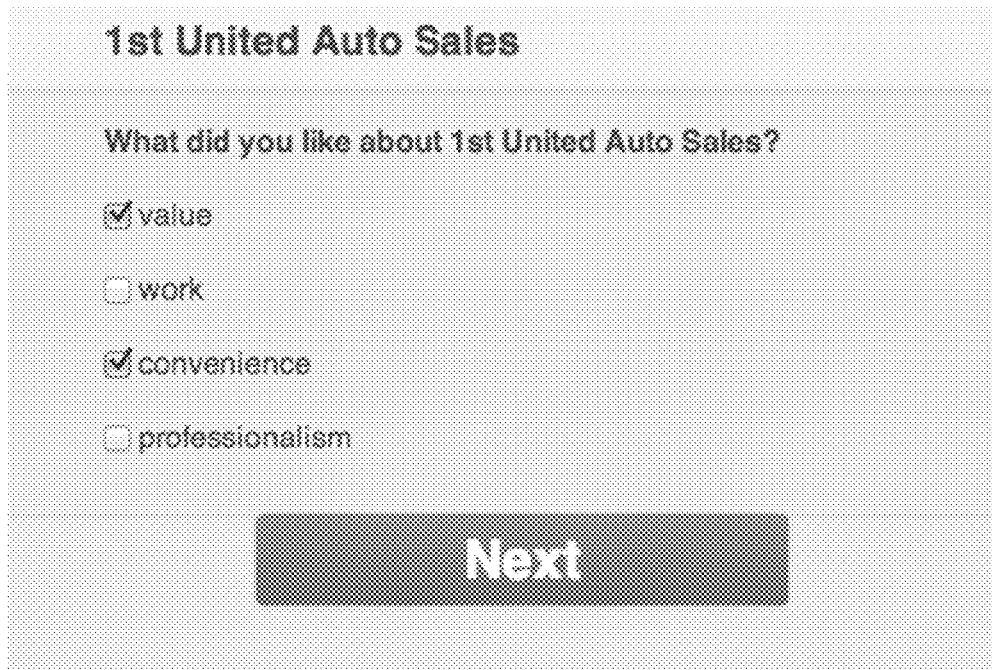

If the user selects "Yes", then the survey generation engine 102 may base the next question on a child choice node of the initial choice node. This child choice node has question choice values of "value", "work", "convenience", and "professionalism" and is related to a question entity with template text of "What did you like about <BUSINESS>?" and a question type of multiple selection. As shown in FIG. 6B, the generated question displayed to the user is "What did you like about 1st United Auto Sales?" and has answer options of "value", "work", "convenience", and "professionalism". The business name "1st United Auto Sales" has been substituted into the placeholder <BUSINESS> in the question template text. The user can select one or more of these answer options in response to the question. In FIG. 6B, the user selected "value" and "convenience" as the criteria for why the user liked the business, and did not select "work" and "professionalism".

The survey generation engine 102 may base the next question on another child choice node of the child choice node. In this case, the selection of the answer option "value" results in the child choice node with question choice values of "very cheap" and "fairly priced" and is related to a question entity with template text of "How would you describe the <CHOICE>?" and a question type of multiple selection. As shown in FIG. 6C, the generated question displayed to the user is "How would you describe the prices?" where the question text value of "prices" has been substituted into the placeholder <CHOICE> in the question template text. The question text value of "prices" is substituted for the placeholder <CHOICE> because the user selected "value" as an answer to the question shown in FIG. 6B and that particular child choice node has a question text value of "prices" and was related to a price-related attribute. The answer options are "very cheap" and "fairly priced" for the question shown in FIG. 6C and the user selected "fairly priced" as their description of the prices, and did not select "very cheap".

Because the user selected "value" and "convenience" for the question in FIG. 6B, the survey generation engine 102 may base the next question on a further child choice node of the child choice node. The further child choice node may be related to the answer option "convenience" and can have question choice values of "easy to set up an appointment", "many appointment times available", "flexible appointment times" and "online scheduling", and be related to a question entity with template text of "What did you find <CHOICE> about <BUSINESS>?" and a question type of multiple selection. As shown in FIG. 6D, the generated question displayed to the user is "What did you find convenient about 1st United Auto Sales?" where the question text value of "convenient" has been substituted into the placeholder <CHOICE> in the question template text and the business name "1st United Auto Sales" has been substituted into the placeholder <BUSINESS>. The answer options are "easy to set up an appointment", "many appointment times available", "flexible appointment times" and "online scheduling" and the user selected "easy to set up an appointment" and "flexible appointment times" as attributes that they found convenient about the business, and did not select "many appointment times available" and "online scheduling".

The survey generation engine 102 may recursively and iteratively traverse the choice tree a second time after the initial traversal of the choice tree. This second traversal of the choice tree may generate a second set of questions and corresponding answer options. The second set of questions and corresponding answer options may include the answer options that were not selected by the user during the initial traversal of the choice tree. In this way, the survey generation engine 102 can collect information regarding the opposite sentiment of the user and produce a better-rounded and complete picture of the user's opinions regarding the business.

For example, FIG. 6E shows a question and corresponding answer options displayed to the user by the survey generation engine 102 that are based on the unselected answer options from the question shown in FIG. 6B. In particular, in response to the question "What did you like about 1st United Auto Sales", the user did not select "work" and "professionalism". As such, the generated question shown in FIG. 6E is based on a choice node with question choice values of "work done" and "professionalism" and is related to a question entity with template text of "Was there anything you did not like about <BUSINESS>?" and a question type of multiple selection. It should be noted that this particular question could have been presented to the user if the user had not recommended the business in response to the initial question (as shown in FIG. 6A). Accordingly, the question shown in FIG. 6E is "Was there anything you did not like about 1st United Auto Sales?" where the business name "1st United Auto Sales" has been substituted into the placeholder <BUSINESS>. The user has selected "professionalism" as a reason why the user did not like the business, and did not select "work done".

The survey generation engine 102 may base the next question on a child choice node of the choice node associated with the question in FIG. 6E. This child choice node has question choice values of "untrustworthy", "rude", "late", "lacking qualifications", and "lacking proper accreditation" and is related to a question entity with template text of "How would you describe <BUSINESS>?" and a question type of multiple selection. As shown in FIG. 6F, the generated question displayed to the user is "How would you describe 1st United Auto Sales?" where the business name "1st United Auto Sales" has been substituted into the placeholder <BUSINESS>. In response to this question, the user has selected "untrustworthy" and "lacking qualifications" as reasons why the user did not like the business' professionalism, and did not select "rude", "late", and "lacking proper accreditation".

A review generation engine 104 of the survey and review prose generation system 100 may be in communication with the survey generation engine 102. A review may be generated by the review generation engine 104 after the answers to one or more of the questions posed in the survey have been received from the user and stored in one or more answer trees that are stored in the survey database 108, as described above. In some embodiments, two answer trees may be stored in the survey database 108 for the initial traversal of the choice tree to collect the initial sentiments from the user, and the second traversal of the choice tree to collect the opposite sentiments from the user. Accordingly, the generated review may include sentences that include positive, neutral, and/or negative sentiments and/or opinions. The generated review may include prose that is human-readable by being syntactically and semantically correct.

The review generation engine 104 may access and utilize the answer trees in the survey database 108 and sentence templates in the review database 110 to generate the review. In particular, the choice types and sentence values in the choice nodes corresponding to the answer nodes in the answer tree may be used to determine the appropriate sentence templates for generating sentences of the review. A generated review may be stored in a review database 110. The generated review can be stored as plain text, in binary, encrypted, unencrypted, and/or in other format, and can have a headline and any number of paragraphs. In some embodiments, the business may be able to generally control the tone of the sentences that are generated for the review.

The initial answer tree corresponding to the initial sentiment of the user can be examined first by the review generation engine 104. A headline of the review may be generated by the review generation engine 104 based on the root answer node of the initial answer tree. The overall sentiment of the review may be conveyed by the root answer node and the headline, e.g., whether the user recommends or does not recommend the business. The choice type of the choice node corresponding to the root answer node defines the syntactic type of the sentence being generated for the headline. The review generation engine 104 may determine a sentence template that is appropriate for the choice type and sentence value by comparing them to a semantic sentence type, sentiment, and narrative type of the potential sentence templates, and generate a sentence based on the selected sentence template. The semantic sentence type of a sentence template may include tokens of choice types so that the review generation engine 104 can determine an appropriate sentence template to utilize for a particular choice node. In some embodiments, the semantic sentence type may be alphabetically sorted and delimited with dashes. The semantic sentence types may include identifiers to assist the review generation engine 104 in determining how particular words can be inserted into generated sentences and how many words are in each generated sentence, i.e., the words chosen for a sentence could be dependent on whether a sentence type includes one or more nouns, adjectives, adverbs, verbs, etc. For example, the words "staff" and "food" are nouns but each word could not be used in an appropriate manner in the sentence template "They have a great <NOUN>." In this example, only the word "staff" would be grammatically correct for this sentence template, i.e., "They have a great staff." is grammatically correct, but "They have a great food." is not grammatically correct. The sentiment of a sentence template may indicate to the review generation engine 104 whether the sentence template should be used for a recommendation (e.g., positive), not a recommendation (e.g., negative), or both a recommendation and not a recommendation (e.g., neutral). The narrative type of sentence template may indicate to the review generation engine 104 what voice the sentence is in, e.g., first person, third person, neutral, etc.

For example, if the user had chosen the answer option of "yes" in response to whether the user would recommend the business, the choice type in that choice node may be a verb and the sentence value may be "loved". The sentence values for criteria regarding why the user recommended the business may include "prices" and "convenience" because the user selected "value" and "convenience" as answer options, as described above. A sentence template of "I <VERB> <BUSINESS> because of their <NOUN>" may be determined to be appropriate, which can result in a generated sentence of "I loved 1st United Auto Sales because of their prices and convenience", for example, as shown in FIG. 6I, by substituting "loved" for <VERB>, the business name for <BUSINESS>, and "prices" and "convenience" for <NOUN>. In some embodiments, the headline may be bolded or otherwise highlighted in the generated review.

The review generation engine 104 may traverse the child answer nodes of the root answer node in the initial answer tree to generate the other sentences of the review. The choice types in the choice nodes corresponding to each of the child answer nodes may be determined. Based on the choice types and other tokens in the choice nodes, a list of child answer nodes with the same choice types can be generated. An appropriate sentence template for each of the child answer nodes may be determined, based on comparing the choice types and tokens to a semantic sentence type, sentiment, and narrative type of the potential sentence templates. Sentences for each of the child answer nodes may be generated by the review generation engine 104 based on the selected sentence templates and the sentence values (that are in the child choice nodes that correspond to the child answer nodes that the user selected). In particular, the review generation engine 104 may substitute the sentence values into the selected sentence templates. In some embodiments, the words of a sentence template and/or the words substituted into the placeholders in the sentence templates may be replaced with synonyms to make particular reviews more unique. In other embodiments, the verbs used in the sentences can be conjugated differently depending on the context, e.g., the other words in the sentences surrounding the verbs.

As an example of generating the sentences of the review, the user had selected that the prices at 1st United Auto Sales were considered to be "fairly priced". The choice type in this particular choice node is an adjective and the sentence value is "fair". In addition, the parent choice node of this particular choice node has a choice type of noun and a sentence value of "prices". The selected sentence template could be "I found the <NOUN> to be <ADJ>.", which can result in a generated sentence of "I found the prices to be fair." by substituting "prices" for <NOUN> and "fair" for <ADJ>, as shown in FIG. 6I. The user had also selected attributes that the user had found convenient about 1st United Auto Sales, including "easy to set up an appointment" and "flexible appointment times". The choice type for this particular choice node is "vn" and the sentence values are "made it easy to set up an appointment" and "had flexible appointment times", respectively. If the selected sentence template is "That they <VN> was something I appreciated.", a generated sentence can result that is "That they made it easy to set up an appointment and had flexible appointment times was something I appreciated." by substituting the sentence fragments for <VN>, as shown in FIG. 6I. In this example, <VN> can denote a particular sentence value that fits appropriately in this sentence template.

The review generation engine 104 may traverse a second answer tree after traversing the initial answer tree. As described above, the second answer tree may correspond to the answer options selected by the user when asked about their opposite sentiments regarding the business. For example, the user had selected that the user did not like the professionalism of the business, and selected attributes of "untrustworthy" and "lacking qualifications" as the reasons why. The choice type in the choice node for "untrustworthy" is an adjective with a sentence value of "untrustworthy" and the choice type in the choice node for "lacking qualifications" is "vn" with a sentence value of "lacked qualifications". The parent choice node has a choice type of noun and a sentence value of "unprofessionalism". If the selected sentence templates are (1) "On the other hand, I thought their <NOUN> could be improved.", (2) "They were <ADJ>.", and (3) They <VN>", then the generated sentences can be "On the other hand, I thought their unprofessionalism could be improved. They were untrustworthy. They lacked qualifications.", as shown in FIG. 6I. The sentences may be generated by substituting the appropriate sentence values into the sentence templates.

It should be noted that even if the user does not answer all of the questions in a particular choice tree corresponding to a business, the review generation engine 104 may generate a review based on one or some of the answers selected by the user. In particular, the selected answers to each question are collected and saved as the survey is being taken by the user. Accordingly, a review can be generated based on any number of saved answers, even if the user has not completed an entire survey. In some embodiments, the user may stop taking the survey at any point and restart the survey at the point where the user left off.

In some embodiments, the generated review may be transmitted to the user electronic device 150 by the review generation engine 104 so that the review can be viewed and/or edited by the user. For example, as shown in FIG. 6G, the user may be presented with text boxes including the generated sentences of the review. The user may make edits to the review to create an edited review that can be transmitted back to the review generation engine 104. Allowing the user to edit the review can result in uniqueness to the reviews so that reviews by different users are visibly different while allowing the underlying discrete selected answer options to be quantitatively analyzed for analytic purposes, as described below. The user does not necessarily have to make edits to the generated review and could leave the generated review as is.

In some embodiments, the review generation engine 104 may allow the user to change the intensity of the review so that certain words and/or phrases of the review can be made stronger and/or weaker. The review generation engine 104 can access a library of nomenclature in a database to express the words and/or phrases of the review using particular emotions, as assigned by the user. The user could click or move a slider bar or select a higher numerical value, for example, to change the intensity of a generated review. The library of nomenclature may include words and/or phrases that have similar meanings but differ in intensity. For example, the initially-generated review prose may include the word "like". If the user wishes to express more intensity in the review, the word "like" could be changed to the word "love". If the user wishes to express less intensity in the review, the word "like" could be changed to the word "tolerated". As another example, the library of nomenclature may include words that express negative emotion but vary in their intensity, e.g., "could not tolerate", "dislike", "hate", etc.

Figure 6H:
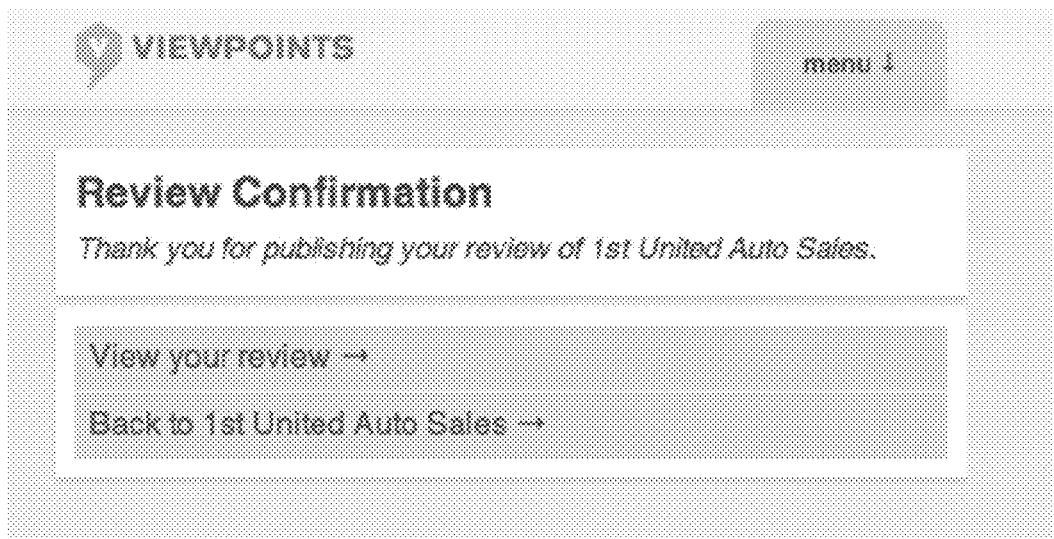

After any edits made by the user to the generated review, the review generation engine 104 may display a review confirmation screen, as shown in FIG. 6H. The user can select to view the review (as shown in FIG. 6I), if desired. The final review (e.g., the edited review, or the generated review, if the user made no edits to the generated review) may be stored in the review database 110 and be associated with the business. In some embodiments, a final review can be associated with a business and/or another point of interest, such as an event, a particular product, and the like. The review generation engine 104 may be in communication with the business electronic device 152 so that the business can view the user's review before it is publically available. In some embodiments, the final review may be transmitted from the review generation engine 104 to the business electronic device 152 so that the business can approve the final review.

The survey and review prose generation system 100 may transmit screen data for generating and displaying the survey and/or review on the user electronic device 150 and/or the business electronic device 152. The screen data may include data for generating graphics, text, animation, audio, and/or other elements of the survey and/or review. The survey and review prose generation system 100 may or may not transmit screen data for generating some or all of the elements of the survey and/or review to the user electronic device 150 and/or the business electronic device 152 at a given time. The user electronic device 150 and/or the business electronic device 152 may store in a cache, memory, and/or other storage medium some or all of the screen data previously transmitted from the system 100, for example. In this case, the user electronic device 150 and/or the business electronic device 152 may utilize this stored screen data and/or screen data subsequently transmitted from the system 100 for generating and displaying a survey and/or review.

In some embodiments, users may have accounts in the survey and review prose generation system 100. The users may create accounts upon an initial access of the system 100, after answering a survey, and/or modify information in an existing account, for example. The account may include a username, a password, a name, an email address, a mailing address, a phone number, credentials for other entities (e.g., social networking websites), and/or other information. The account information may be stored in an account database 112. For example, in some embodiments, after selecting answer options in a survey, the system 100 can determine whether the user is already logged in, such as if the user was previously logged in through the system 100 or is logged in via an affiliated system, such as Facebook. The system 100 may examine a cookie on the user electronic device 150 to determine if the user is already logged in, for example. If the user is not logged in, then the system 100 can prompt the user to enter a user identification, such as an email address or other unique identifier (e.g., phone number, account number, etc.). If the user identification is found in the account database 112, then the completed survey may be associated with the user. However, if the user identification is not found in the account database 112, then the user can create an account so that the user can be associated with the completed survey. Associating a review with a registered user can help encourage honest responses from users and correspondingly, more reliable reviews of the business.

An analytics engine 106 may be in communication with the survey database 108 and/or the review database 110. The selected answer options that are stored in the review database 110 for users may be analyzed by the analytics engine 106 to produce analytic data, such as overall ratings, reasons and/or factors why a business or particular location of a business has been recommended or not recommended, the number of reviews, the date and time of the reviews, and other data. For example, the date and time of a particular review could be utilized by the business so that the review can be cross-referenced to a particular employee or set of employees that were working at that date and time. In some embodiments, the analytic data may be unique to a particular business and/or the category of the business. As an example, an automobile repair business may include analytic data related to the quality of services and repairs performed by the business. Because answer options are discrete and limited, the selection of particular answer options by a user makes it easier to quantitatively analyze responses to the survey. The review prose itself may also be analyzed by the analytics engine 106 to produce analytics data, in some embodiments, particularly if the user has edited a generated review and/or entered content into a free response text answer field. The analytic data may be stored in the review database 110, and be transmitted to the business electronic device 152, to a public webpage (that can be viewed by prospective consumers, for example), and/or to other entities.

FIG. 2 is a block diagram of a computing device 200 housing executable software used to facilitate the survey and review prose generation system 100. One or more instances of the computing device 200 may be utilized to implement any, some, or all of the components in the survey and review prose generation system 100, including the survey generation engine 102, the review generation engine 104, and the analytics engine 106. Computing device 200 includes a memory element 204. Memory element 204 may include a computer readable medium for implementing the survey and review prose generation system 100, and for implementing particular system transactions. Memory element 204 may also be utilized to implement the survey database 108, the review database 110, and the account database 112. Computing device 200 also contains executable software, some of which may or may not be unique to the survey and review prose generation system 100.

In some embodiments, the survey and review prose generation system 100 is implemented in software, as an executable program, and is executed by one or more special or general purpose digital computer(s), such as a mainframe computer, a personal computer (desktop, laptop or otherwise), personal digital assistant, or other handheld computing device. Therefore, computing device 200 may be representative of any computer in which the survey and review prose generation system 100 resides or partially resides.

Generally, in terms of hardware architecture as shown in FIG. 2, computing device 200 includes a processor 202, a memory 204, and one or more input and/or output (I/O) devices 206 (or peripherals) that are communicatively coupled via a local interface 208. Local interface 208 may be one or more buses or other wired or wireless connections, as is known in the art. Local interface 208 may have additional elements, which are omitted for simplicity, such as controllers, buffers (caches), drivers, transmitters, and receivers to facilitate external communications with other like or dissimilar computing devices. Further, local interface 208 may include address, control, and/or data connections to enable internal communications among the other computer components.

Processor 202 is a hardware device for executing software, particularly software stored in memory 204. Processor 202 can be any custom made or commercially available processor, such as, for example, a Core series or vPro processor made by Intel Corporation, or a Phenom, Athlon or Sempron processor made by Advanced Micro Devices, Inc. In the case where computing device 200 is a server, the processor may be, for example, a Xeon or Itanium processor from Intel, or an Opteron-series processor from Advanced Micro Devices, Inc. Processor 202 may also represent multiple parallel or distributed processors working in unison.

Memory 204 can include any one or a combination of volatile memory elements (e.g., random access memory (RAM, such as DRAM, SRAM, SDRAM, etc.)) and non-volatile memory elements (e.g., ROM, hard drive, flash drive, CDROM, etc.). It may incorporate electronic, magnetic, optical, and/or other types of storage media. Memory 204 can have a distributed architecture where various components are situated remote from one another, but are still accessed by processor 202. These other components may reside on devices located elsewhere on a network or in a cloud arrangement.

The software in memory 204 may include one or more separate programs. The separate programs comprise ordered listings of executable instructions for implementing logical functions. In the example of FIG. 2, the software in memory 204 may include the survey and review prose generation system 100 in accordance with the invention, and a suitable operating system (O/S) 212. Examples of suitable commercially available operating systems 212 are Windows operating systems available from Microsoft Corporation, Mac OS X available from Apple Computer, Inc., a Unix operating system from AT&T, or a Unix-derivative such as BSD or Linux. The operating system O/S 212 will depend on the type of computing device 200. For example, if the computing device 200 is a PDA or handheld computer, the operating system 212 may be iOS for operating certain devices from Apple Computer, Inc., PalmOS for devices from Palm Computing, Inc., Windows Phone 8 from Microsoft Corporation, Android from Google, Inc., or Symbian from Nokia Corporation. Operating system 212 essentially controls the execution of other computer programs, such as the survey and review prose generation system 100, and provides scheduling, input-output control, file and data management, memory management, and communication control and related services.

If computing device 200 is an IBM PC compatible computer or the like, the software in memory 204 may further include a basic input output system (BIOS). The BIOS is a set of essential software routines that initialize and test hardware at startup, start operating system 212, and support the transfer of data among the hardware devices. The BIOS is stored in ROM so that the BIOS can be executed when computing device 200 is activated.

Steps and/or elements, and/or portions thereof of the invention may be implemented using a source program, executable program (object code), script, or any other entity comprising a set of instructions to be performed. Furthermore, the software embodying the invention can be written as (a) an object oriented programming language, which has classes of data and methods, or (b) a procedural programming language, which has routines, subroutines, and/or functions, for example but not limited to, C, C++, C#, Pascal, Basic, Fortran, Cobol, Perl, Java, Ruby, Ada, and Lua. Components of the survey and review prose generation system 100 may also be written in a proprietary language developed to interact with these known languages.

I/O device 206 may include input devices such as a keyboard, a mouse, a scanner, a microphone, a touch screen, a bar code reader, or an infra-red reader. It may also include output devices such as a printer, a video display, an audio speaker or headphone port or a projector. I/O device 206 may also comprise devices that communicate with inputs or outputs, such as a short-range transceiver (RFID, Bluetooth, etc.), a telephonic interface, a cellular communication port, a router, or other types of network communication equipment. I/O device 206 may be internal to computing device 200, or may be external and connected wirelessly or via connection cable, such as through a universal serial bus port.

When computing device 200 is in operation, processor 202 is configured to execute software stored within memory 204, to communicate data to and from memory 204, and to generally control operations of computing device 200 pursuant to the software. The survey and review prose generation system 100 and operating system 212, in whole or in part, may be read by processor 202, buffered within processor 202, and then executed.

In the context of this document, a "computer-readable medium" may be any means that can store, communicate, propagate, or transport data objects for use by or in connection with the survey and review prose generation system 100. The computer readable medium may be for example, an electronic, magnetic, optical, electromagnetic, infrared, or semiconductor system, apparatus, device, propagation medium, or any other device with similar functionality. More specific examples (a non-exhaustive list) of the computer-readable medium would include the following: an electrical connection (electronic) having one or more wires, a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and stored in a computer memory. The survey and review prose generation system 100 can be embodied in any type of computer-readable medium for use by or in connection with an instruction execution system or apparatus, such as a computer.

For purposes of connecting to other computing devices, computing device 200 is equipped with network communication equipment and circuitry. In an embodiment, the network communication equipment includes a network card such as an Ethernet card, or a wireless connection card. In a network environment, each of the plurality of computing devices 200 on the network is configured to use the Internet protocol suite (TCP/IP) to communicate with one another. It will be understood, however, that a variety of network protocols could also be employed, such as IEEE 802.11 Wi-Fi, address resolution protocol ARP, spanning-tree protocol STP, or fiber-distributed data interface FDDI. It will also be understood that while an embodiment of the invention is for each computing device 200 to have a broadband or wireless connection to the Internet (such as DSL, Cable, Wireless, T-1, T-3, OC3 or satellite, etc.), the principles of the invention are also practicable with a dialup connection through a standard modem or other connection means. Wireless network connections are also contemplated, such as wireless Ethernet, satellite, infrared, radio frequency, Bluetooth, near field communication, and cellular networks.

Figure 3:
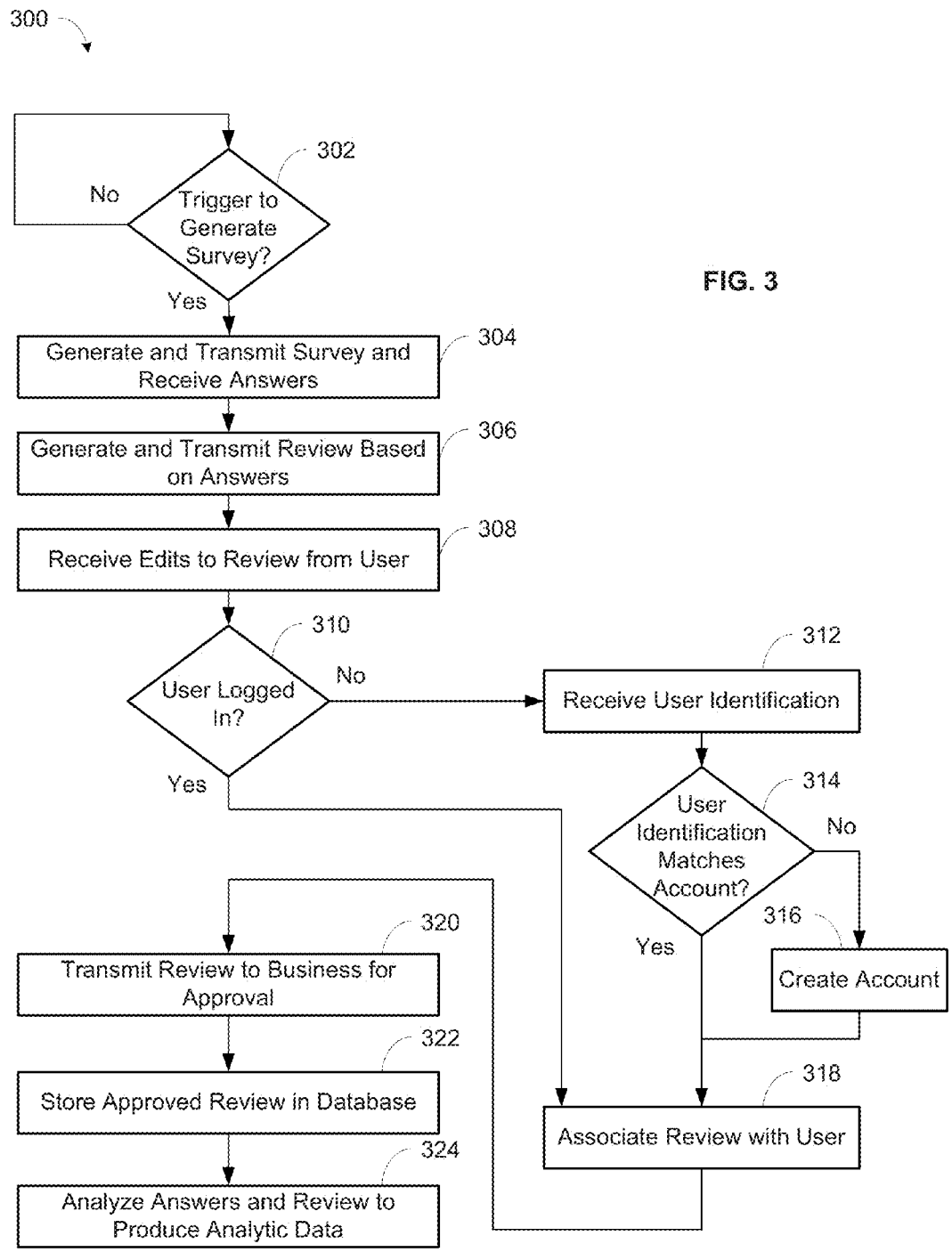
FIG. 3 is a flow diagram illustrating operations for generating adaptive surveys and review prose using the system of FIG. 1.

FIG. 3 is a flowchart of a process 300 for generating adaptive surveys and review prose, in accordance with one or more principles of the invention. The process 300 may result in the generation of a survey with questions and answer options for each of the questions, and the generation of a review based on sentence templates and the selection of answers to the survey. The survey may be taken by a user and may relate to a business, for example. The user may include a consumer who has patronized the business. The business may include any type of business wishing to gather feedback regarding their business, such as, for example, contractors, retailers, restaurants, service providers, etc. At step 302, it can be determined whether a trigger to initiate and generate a survey has been received, such as from the user electronic device 150. The trigger may include requests to initiate and generate the survey through a standard or mobile website, an email or SMS text containing a link to the survey (e.g., a URL), a quick response (QR) code representing the link, near field communication (NFC), geofencing, or other triggers. If a trigger has not been received, then the process 300 returns to step 302 to wait for a trigger to be received. However, if a trigger is received at step 302, then the process 300 continues to step 304. At step 304, a survey may be generated and transmitted, such as to the user electronic device 150. The survey may correspond to a particular business and/or a category of the business, and may include a series of one or more questions with each of the questions including multiple answer options. The answer options may be selectable and the user may select one or multiple answer options, such as by using checkboxes and/or radio buttons, as appropriate. The answer options may include one or more free response text answer fields, in some embodiments. The selected answer options to each of the questions the survey may also be received at step 304, such as from the user electronic device 150. Step 304 is detailed further below with reference to the process 304 shown in FIG. 4.

After receiving answers to the survey at step 304, a review may be generated based on the answers at step 306. The review may include sentences that include positive and negative sentiments and opinions, and include prose that is human-readable by being syntactically and semantically correct. The generated review may also be transmitted at step 306, such as to the user electronic device 150. Step 306 is detailed further below with reference to the process 306 shown in FIG. 5. At step 308, edits to the generated review may be received, such as from the user electronic device 150. The edits may include changes to the prose of the review, and/or the intensity of the review, for example. The user may have also made no edits to the generated review.

After receiving any edits to the review from the user at step 308, it may be determined at step 310 whether the user is logged in. The user may have logged in prior to answering the survey, for example, or be logged in via an affiliated system. If the user is logged in, then the process 300 continues to step 318 and the completed review can be associated with the user. However, if the user is not logged in at step 310, then the process 300 continues to step 312. At step 312, a unique user identification, such as an email address, phone number, etc., may be received. At step 314, it can be determined whether the supplied user identification matches an existing account. If the user identification matches an existing account, then the process 300 continues to step 318 to associate the completed review with the user. However, if the user identification does not match an existing account, then the process 300 continues to step 316 to allow the user to create an account. The user may create an account by supplying a user identification (e.g., username), password, name, email address, and/or other information at step 316. Following step 316, the completed review may be associated with the user at step 318.

Following step 318, the process 300 continues to step 320 where the completed review can be transmitted to the business for approval to the review. The review may be transmitted to the business electronic device 152, for example. At step 322, the approved review may be stored in a database and may be associated with the business. In some embodiments, an approved review can be associated with a business and/or another point of interest, such as an event, a particular product, and the like. The approved review may also be transmitted, such as to a public website or other entity. Following step 322, the answers to the survey and the generated review may be analyzed at step 324 to produce analytic data. The analytic data may include overall ratings, reasons why a business or particular location of a business has been recommended or not recommended, the number of reviews, the date and time of the reviews, and other data. The business may utilize the analytic data to determine whether its marketing efforts are effective, to evaluate their business and/or particular locations of the business, to determine and influence the direction of future marketing efforts, and/or for other purposes, for example. In some embodiments, the analytic data may be unique to a particular business and/or the category of the business.

Figure 4:
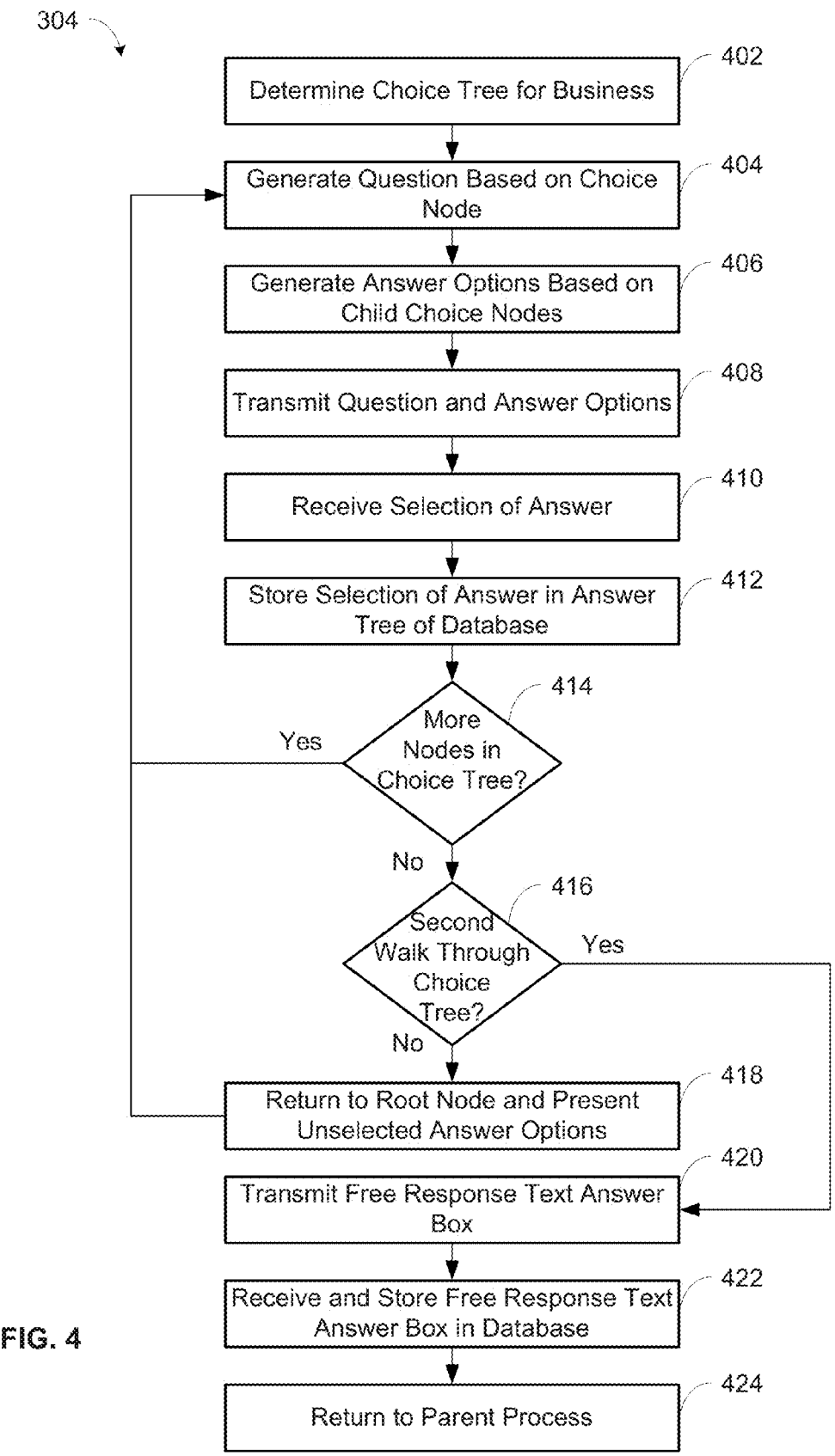
FIG. 4 is a flow diagram illustrating operations for generating and transmitting a survey and receiving answers to the survey in conjunction with the operations illustrated in FIG. 3.

An embodiment of a process 304 for generating and transmitting a survey, and for receiving answers to the survey is shown in FIG. 4. The process 304 shown in FIG. 4 may correspond to step 304 of the process 300 in FIG. 3. At step 402, a choice tree data structure may be determined that corresponds to the business and/or the category of the business that the survey is related to. The choice tree may include a set of linked choice nodes that can be the basis for generating the questions of the survey. Each of the choice nodes may have any number of child choice nodes that can be the basis for generating future follow-up questions and the answer options for such questions. Each choice node and child choice node may have attributes including a choice type, a question choice value, a question text value, a sentence value, an analytic value, and/or other attributes. The choice type may include a token that determines the syntactic type of the sentence value so that the sentences in the review have the correct syntax, as described below. The question choice value may include a value that can be displayed as a possible answer option that a user can select in response to a question in the survey. The question text value may include a value that can be substituted into a future follow-up question presented to the user if the user selects the particular choice node. The sentence value may include a value that can be used to construct sentences in a generated review. The analytic value may include a value used to produce analytic data that is related to the business and/or the category of the business.

Each choice node may be related to a question entity that includes the template text for the current question to be posed to a user. The question entity can include the type of question that indicates how the user may interact with the answer options (e.g., single selection, button selection, multiple selection, free response, etc.) and the template text of the question. The template text of the question may include placeholders for substituting particular word(s). At step 404, a question can be generated based on one of the choice nodes of the choice tree determined at step 402. The full text of a particular question can be generated by substituting the question text value of a particular choice node and its parent choice node (if applicable) into a question text template, as appropriate. The answer options for the particular question can be generated at step 406, based on the question choice values in each of the child choice nodes of the particular choice node. The generated question and answer options may be transmitted at step 408, such as to the user electronic device 150. The user can select one or more of the answer options for the particular question on the user electronic device 150, such as by clicking or tapping on one or more of the desired answer options, as appropriate. Some questions may ask the user to select a single answer option, other questions may ask the user to select one or more answer options, while still other questions may ask the user to respond in a free response text answer field.

Each of the selected answer option(s) in response to a question may be received at step 410 from the user electronic device 150. The selected answer option(s) may be stored in a database at step 412, such as in an answer tree data structure. The answer tree may include a set of linked answer nodes that each represents the answer option selected by a user for a particular question. The answer tree may include a root answer node and any number of child answer nodes of the root answer node. The root answer node and each of the child answer nodes may have attributes including an initial answer value, a back token value, an intensity value, a completed flag, and a free response text answer field value. The answer tree and its answer nodes may have a relationship with the choice tree that the survey is based on. In particular, the root answer node and each of the child answer nodes may respectively correspond to a choice node in the choice tree. In this way, a particular answer node in the answer tree can have access to and retrieve the attributes in the corresponding choice node for purposes of generating sentences of the review, as described below. The answer tree and its answer nodes may have a relationship with the choice tree, described above. In particular, the root answer node and each of the child answer nodes may respectively correspond to a choice node in the choice tree. In this way, a particular answer node in the answer tree can have access to and retrieve the attributes in the corresponding choice node for purposes of generating sentences of the review, as described below.

After storing the selected answer option(s) at step 412, the process 304 continues to step 414 where it is determined whether there are more nodes to traverse in the choice tree. There may be more nodes to traverse in the choice tree if there are further questions to ask in the survey, for example. If there are more nodes in the choice tree to traverse at step 414, then the process 304 returns to perform steps 404, 406, 408, 410, and 412 for each of the remaining nodes. However, if there are no more nodes in the choice tree to traverse at step 414, then the process 304 continues to step 416 to determine whether this is the second walk through the choice tree. The choice tree may be traversed a second time to generate a second set of questions and corresponding answer options. The second set of questions and corresponding answer options may include the answer options that were not selected by the user during the initial traversal of the choice tree. In this way, information can be collected regarding the opposite sentiment of the user and produce a better-rounded and complete picture of the user's opinions regarding the business.

If it is determined that it is not the second walk through the choice tree at step 416, then the process 304 continues to step 418 to return to the root choice node of the choice tree to present the unselected answer options to the user. The process 304 returns to perform steps 404, 406, 408, 410, 412, and 414 for each of the choice nodes that correspond to the unselected answer options. If it is determined that it is the second walk through the choice tree at step 416, then the process 304 continues to step 420 where a free response text answer field may be transmitted to the user electronic device 150. The free response text answer field may be for the purpose of gathering miscellaneous comments and suggestions from the user. The contents of a response to the free response text answer field may be received and stored in a database at step 422. At step 424, the process 304 may return to the parent process 300 and continue performing the process 300.

Figure 5:
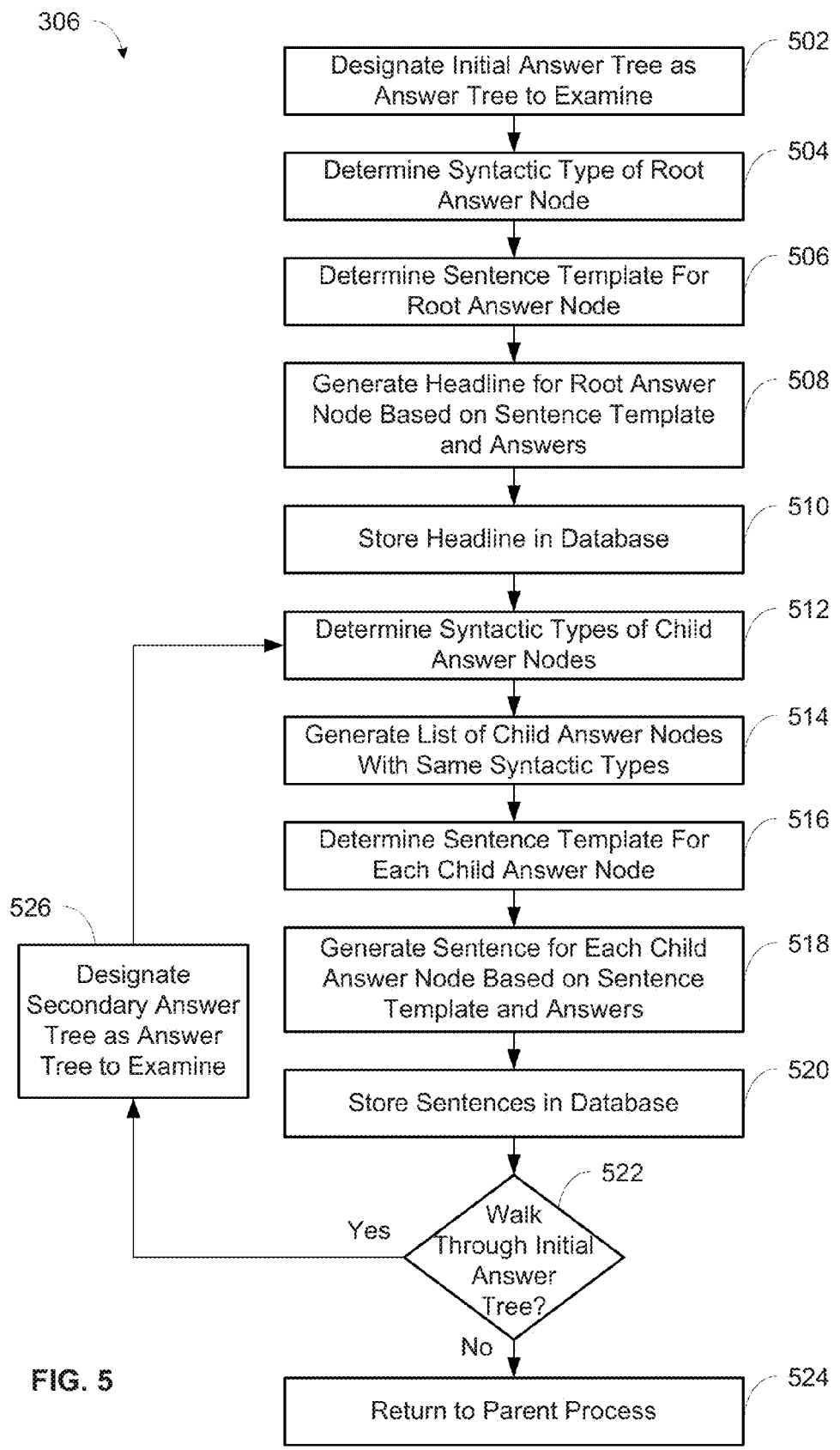
FIG. 5 is a flow diagram illustrating operations for generating and transmitting a review based on the answers to the survey in conjunction with the operations illustrated in FIG. 3.

An embodiment of a process 306 for generating and transmitting a review based on answers to a survey is shown in FIG. 5. The process 306 shown in FIG. 5 may correspond to step 306 of the process 300 in FIG. 3. At step 502, an initial answer tree may be designated as the answer tree to examine in the process 306. As described above, two answer trees may be stored in the survey database 108 for the initial traversal of the choice tree to collect the initial sentiments from the user, and the second traversal of the choice tree to collect the opposite sentiments from the user. Accordingly, the generated review may include sentences that include positive, neutral, and negative sentiments and opinions. The generated review may include prose that is human-readable by being syntactically and semantically correct. The process 306 may access and utilize the answer trees and sentence templates to generate the review. In particular, the choice types and sentence values in the choice nodes corresponding to the answer nodes in the answer tree may be used to determine the appropriate sentence templates for generating sentences of the review.

A headline of the review may be generated based on the root answer node of the initial answer tree. The choice type (corresponding to the syntactic type) in the root answer node of the initial answer tree may be determined at step 504. A sentence template appropriate for the choice type and sentence value of the selected answer option may be determined at step 506 by comparing them to the semantic sentence type, sentiment, and narrative type of the potential sentence templates. The semantic sentence type of a sentence template may include tokens of choice types so that an appropriate sentence template can be determined to utilize for a particular choice node. The sentiment of a sentence template may indicate whether the sentence template should be used for a recommendation (e.g., positive), not a recommendation (e.g., negative), or both a recommendation and not a recommendation (e.g., neutral). The narrative type of sentence template may indicate what voice the sentence is in, e.g., first person, third person, neutral, etc. The headline of the review may be generated at step 508 based on the sentence template determined at step 506 and the answer option(s) selected by the user in response to the initial question of the survey. The generated headline may be stored in a database at step 510.

At step 512, the choice types (corresponding to the syntactic types) in the choice nodes corresponding to each of the child answer nodes in the initial answer tree may be determined. Each of the child answer nodes may be traversed to generate the other sentences of the review. A list of the child answer nodes with the same choice types can be generated at step 514. The list may be generated based on the choice types and other tokens in the choice nodes. An appropriate sentence template for each of the child answer nodes may be determined at step 516 by comparing the choice types and tokens to a semantic sentence type, sentiment, and narrative type of the potential sentence templates. At step 518, a sentence for each of the child answer nodes may be generated based on the selected sentence templates and the sentence values (that are in the child choice nodes that correspond to the child answer nodes that the user selected). The sentence values may be substituted into the selected sentence templates to generate each sentence. The generated sentences may be stored in a database at step 520.

At step 522, it may be determined whether the traversal that just occurred in steps 512 through 520 is a walk through the initial answer tree. The initial answer tree is traversed first to generate sentences based on the initial sentiment of the user responding to a survey. As described above, a secondary answer tree may have also been created when the user answered questions related to the opposite sentiment. As such, if the traversal is a walk through the initial answer tree at step 522, then the process 306 continues to step 526 where the secondary answer tree is designated as the answer tree to examine. The process 306 then proceeds to perform steps 512, 514, 516, 518, and 520 on the answer nodes of the secondary answer tree so that sentences of the review are generated that are related to the opposite sentiment of the user. However, if the traversal at step 522 is determined to not be a walk through the initial answer tree, then the process 306 continues to step 524 to return to the parent process 300 and continue performing the process 300.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A method for generating a survey and a review for a business, the review comprising human-readable prose generated based on the survey, the method comprising:

generating the survey comprising at least one question associated with the business and a plurality of answer options for the at least one question, using a processor;

transmitting the survey from the processor to an electronic device associated with a user;

receiving a selection of at least one answer from the plurality of answer options at the processor from the electronic device associated with the user;

storing the selection of the at least one answer in a database as one or more answer trees having one or more answer nodes, using a survey generation engine of the processor, wherein each of the one or more answer nodes corresponds to i) an answer selected by the user for a particular question, ii) a sentence value for the answer, and iii) a syntactic type of the sentence value;

automatically generating i) the human-readable prose of the review based on a plurality of sentence templates and the one or more answer trees, and ii) business analytic data based on the selection of the at least one answer, using the processor;

transmitting the review from the processor to the electronic device associated with the user;

receiving an edited review at the processor from the electronic device associated with the user;

transmitting the edited review from the processor to an electronic device associated with the business;

receiving an approval of the edited review at the processor from the electronic device associated with the business; and storing the edited review and the business analytic data in the database, using the processor, wherein the edited review is associated with the business;

wherein each of the plurality of sentence templates comprises a semantic sentence type, a sentiment type, text, and a narrative type;

wherein automatically generating the human-readable prose of the review comprises:
  traversing the one or more answer trees to determine the syntactic types that correspond to each of the one or more answer nodes;
  selecting a respective sentence template for each of the one or more answer nodes, from the plurality of sentence templates, that has a semantic sentence type that matches the syntactic type of the answer node; and
  generating, for each of the one or more answer nodes, a sentence of the human-readable prose of the review based on the selected sentence template and the sentence value that corresponds to the answer node.

2. The method of claim 1, wherein generating the business analytic data comprises:
  analyzing the selection of the at least one answer and the edited review to generate the business analytic data, using the processor, wherein the business analytic data is related to one or more of the business or a category of the business; and
  transmitting the business analytic data from the processor to the electronic device associated with the business.

3. The method of claim 1, further comprising:
  determining whether the user is logged in, in response to receiving the edited review, using the processor;
  associating the edited review with the user, using the processor, if the user is logged in; and
  if the user is not logged in:
    receiving a user identification at the processor from the electronic device associated with the user;
    determining whether the user identification matches an existing account in the database, using the processor;
    associating the edited review with the user, using the processor, if the user identification matches the existing account; and
    if the user identification does not match the existing account:
      creating an account for the user, using the processor; and
      associating the edited review with the user, using the processor.

4. The method of claim 1, wherein:
  generating the survey comprises:
    determining a choice tree corresponding to the business, using the processor, wherein the choice tree is stored in the database and comprises a plurality of choice nodes, wherein each of the plurality of choice nodes has a plurality of child choice nodes, and wherein each of the plurality of choice nodes and each of the plurality of child choice nodes comprises a question text value and a question choice value;
    generating the at least one question based on the question text value of one of the plurality of choice nodes, using the processor; and
    generating the plurality of answer options based on the question choice value of each of a plurality of child choice nodes of the one of the plurality of choice nodes, using the processor; and
    transmitting the survey comprises transmitting the at least one question and the plurality of answer options from the processor to the electronic device associated with the user.

5. The method of claim 4, wherein determining the choice tree comprises determining the choice tree corresponding to a category of the business, using the processor.

6. The method of claim 4, wherein generating the at least one question comprises substituting the question text value of the one of the plurality of choice nodes into a question text to generate the at least one question, using the processor.

7. The method of claim 4, wherein:
  generating the survey further comprises:
    generating the at least one question based on the question text value of one of the plurality of choice nodes and based on the plurality of answer options that were not part of the selection of the at least one answer, using the processor; and
    generating the plurality of answer options based on the question choice value of each of the plurality of child choice nodes of the one of the plurality of choice nodes that were not part of the selection of the at least one answer, using the processor; and
    transmitting the survey comprises transmitting the at least one question and the plurality of answer options from the processor to the electronic device associated with the user.

8. The method of claim 1, wherein generating the survey comprises:
  transmitting a free response text answer field from the processor to the electronic device associated with the user, receiving contents of the free response text answer field at the processor from the electronic device associated with the user, and storing the contents of the free response text answer field in the database, using the processor.

9. The method of claim 1, wherein the one or more answer trees include an answer tree in the database, wherein the answer tree comprises a root answer node and a plurality of child answer nodes of the root answer node, wherein the root answer node and each of the plurality of child answer nodes comprises an answer value, wherein each of the plurality of child answer nodes corresponds to a choice node indicated by the answer value and included in a choice tree corresponding to the business, and wherein the choice node comprises the syntactic type and the sentence value that correspond to the answer node;
  generating the human-readable prose of the review comprises:
    determining the syntactic type for the root answer node and each of the plurality of child answer nodes of the root answer node, using the processor;
    generating a list of child answer nodes with the syntactic types that are the same, using the processor;
    determining at least one of the plurality of sentence templates for the root answer node and each of the list of child answer nodes with the syntactic types that are the same, using the processor, based on the answer value of the root answer node and each of the plurality of child answer nodes, and the semantic sentence type, the sentiment type, the text, and the narrative type of each of the plurality of sentence templates; and
    generating the sentence of the human-readable prose of the review based on the sentence value of the choice node corresponding to the root answer node and each of the plurality of child answer nodes, and the at least one of the plurality of sentence templates for the root answer node and each of the plurality of child answer nodes, using the processor.

10. The method of claim 9, wherein the syntactic type comprises one or more of a verb, a noun, an adjective, or a sentence fragment.

11. The method of claim 9, wherein generating the sentence of the review comprises substituting the sentence value of the choice node corresponding to the root answer node and each of the plurality of child answer nodes into the at least one of the plurality of sentence templates for the root answer node and each of the plurality of child answer nodes, using the processor.

12. The method of claim 1, further comprising:
receiving a trigger to generate the survey at the processor from the electronic device associated with the user, wherein the trigger is based on one or more of a geofence trigger, a near field communication trigger, a quick response code trigger, an email trigger, an SMS trigger, or a web site trigger.

13. The method of claim 1, wherein the edited review comprises one or more of a change to the human-readable prose of the review or a change in intensity of the prose of the review.

14. The method of claim 1, wherein the edited review comprises the review.

15. A system for generating a survey and a review for a business, the review comprising human-readable prose generated based on the survey, the system comprising:
a processor in communication with a network;
a memory in communication with the processor, the memory for storing:
a survey database and a review database;
a survey generation engine that configures the processor for:
generating the survey comprising at least one question associated with the business and a plurality of answer options for the at least one question;
transmitting the survey to an electronic device associated with a user;
receiving a selection of at least one answer from the plurality of answer options from the electronic device associated with the user; and
storing the selection of the at least one answer in the survey database as one or more answer trees having one or more answer nodes, wherein each of the one or more answer nodes corresponds to i) an answer selected by the user for a particular question, ii) a sentence value for the answer, and iii) a syntactic type of the sentence value;
a review generation engine that configures the processor for:
automatically generating i) the human-readable prose of the review based on a plurality of sentence templates and the one or more answer trees, and ii) business analytic data based on the selection of the at least one answer;
transmitting the review to the electronic device associated with the user;
receiving an edited review from the electronic device associated with the user, transmitting the edited review to an electronic device associated with the business;
receiving an approval of the edited review from the electronic device associated with the business; and
storing the edited review and the business analytic data in the review database, wherein the edited review is associated with the business;
wherein each of the plurality of sentence templates comprises a semantic sentence type, a sentiment type, text, and a narrative type;
wherein the review generation engine configures the processor for:
traversing the one or more answer trees to determine the syntactic types that correspond to each of the one or more answer nodes;
selecting a respective sentence template for each of the one or more answer nodes, from the plurality of sentence templates, that has a semantic sentence type that matches the syntactic type of the answer node;
generating, for each of the one or more answer nodes, a sentence of the human-readable prose of the review based on the selected sentence template and the sentence value that corresponds to the answer node.

16. The system of claim 15, further comprising an analytics engine that configures the processor for:
analyzing the selection of the at least one answer and the edited review to generate the business analytic data, wherein the business analytic data is related to one or more of the business or a category of the business; and
transmitting the business analytic data to the electronic device associated with the business.

17. The system of claim 15, wherein:
the memory further comprises an account database; and
the review generation engine configures the processor for:
determining whether the user is logged in, in response to receiving the edited review;
associating the edited review with the user, if the user is logged in; and
if the user is not logged in:
receiving a user identification from the electronic device associated with the user;
determining whether the user identification matches an existing account in the account database;
associating the edited review with the user, if the user identification matches the existing account; and
if the user identification does not match the existing account:
creating an account for the user; and
associating the edited review with the user.

18. The system of claim 15, wherein:
the survey generation engine configures the processor for:
determining a choice tree corresponding to the business, wherein the choice tree is stored in the survey database and comprises a plurality of choice nodes, wherein each of the plurality of choice nodes has a plurality of child choice nodes, and wherein each of the plurality of choice nodes and each of the plurality of child choice nodes comprises a question text value and a question choice value;
generating the at least one question based on the question text value of one of the plurality of choice nodes; and
generating the plurality of answer options based on the question choice value of each of a plurality of child choice nodes of the one of the plurality of choice nodes; and
transmitting the at least one question and the plurality of answer options to the electronic device associated with the user.

19. The system of claim 18, wherein the survey generation engine configures the processor for determining the choice tree by determining the choice tree corresponding to a category of the business.

20. The system of claim 18, wherein the survey generation engine configures the processor for generating the at least one question by substituting the question text value of the one of the plurality of choice nodes into a question text to generate the at least one question.

21. The system of claim 18, wherein the survey generation engine configures the processor for:
   generating the at least one question based on the question text value of one of the plurality of choice nodes and based on the plurality of answer options that were not part of the selection of the at least one answer;
   generating the plurality of answer options based on the question choice value of each of the plurality of child choice nodes of the one of the plurality of choice nodes that were not part of the selection of the at least one answer; and
   transmitting the at least one question and the plurality of answer options to the electronic device associated with the user.

22. The system of claim 15, wherein the survey generation engine configures the processor for:
   transmitting a free response text answer field to the electronic device associated with the user;
   receiving contents of the free response text answer field from the electronic device associated with the user; and
   storing the contents of the free response text answer field in the survey database.

23. The system of claim 15, wherein the one or more answer trees include an answer tree in the survey database, wherein the answer tree comprises a root answer node and a plurality of child answer nodes of the root answer node, wherein the root answer node and each of the plurality of child answer nodes comprises an answer value, wherein each of the plurality of child answer nodes corresponds to a choice node indicated by the answer value and included in a choice tree corresponding to the business, and wherein the choice node comprises the syntactic type and the sentence value that correspond to the answer node;
   the review generation engine configures the processor for:
      determining the syntactic type for the root answer node and each of the plurality of child answer nodes of the root answer node;
      generating a list of child answer nodes with the syntactic types that are the same;
      determining at least one of the plurality of sentence templates for the root answer node and each of the list of child answer nodes with the syntactic types that are the same, based on the answer value of the root answer node and each of the plurality of child answer nodes, and the semantic sentence type, the sentiment type, the text, and the narrative type of each of the plurality of sentence templates; and
      generating the sentence of the human-readable prose of the review based on the sentence value of the choice node corresponding to the root answer node and each of the plurality of child answer nodes, and the at least one of the plurality of sentence templates for the root answer node and each of the plurality of child answer nodes.

24. The system of claim 23, wherein the syntactic type comprises one or more of a verb, a noun, an adjective, or a sentence fragment.

25. The system of claim 23, wherein the review generation engine configures the processor for substituting the sentence value of the choice node corresponding to the root answer node and each of the plurality of child answer nodes into the at least one of the plurality of sentence templates for the root answer node and each of the plurality of child answer nodes.

26. The system of claim 15, wherein the survey generation engine configures the processor for:
   receiving a trigger to generate the survey from the electronic device associated with the user, wherein the trigger is based on or more of a geofence trigger, a near field communication trigger, a quick response code trigger, an email trigger, or a website trigger.

27. The system of claim 15, wherein the edited review comprises one or more of a change to the human-readable prose of the review or a change in intensity of the prose of the review.

28. The system of claim 15, wherein the edited review comprises the review.

* * * * *